United States Patent
Ikehara et al.

(10) Patent No.: US 10,887,738 B2
(45) Date of Patent: Jan. 5, 2021

(54) VEHICULAR INFORMATION PROCESSING SYSTEM, VEHICULAR INFORMATION PROCESSING PROGRAM, AND MOBILE COMMUNICATION TERMINAL THE SUPPRESSES EXCESSIVE INCREASE IN TRAFFIC BETWEEN MOBILE COMMUNICATION TERMINAL AND IN-VEHICULAR DEVICE

(71) Applicant: MITSUBISHI JIDOSHA KOGYO KABUSHIKI KAISHA, Tokyo (JP)

(72) Inventors: Yuichi Ikehara, Tokyo (JP); Yoko Muta, Tokyo (JP); Koji Maema, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/473,522

(22) PCT Filed: Dec. 27, 2017

(86) PCT No.: PCT/JP2017/046883
§ 371 (c)(1),
(2) Date: Jun. 25, 2019

(87) PCT Pub. No.: WO2018/124174
PCT Pub. Date: Jul. 5, 2018

(65) Prior Publication Data
US 2019/0335305 A1    Oct. 31, 2019

(30) Foreign Application Priority Data
Dec. 28, 2016   (JP) .................. 2016-255883

(51) Int. Cl.
*H04W 4/44* (2018.01)
*H04L 29/08* (2006.01)
*B60R 16/023* (2006.01)

(52) U.S. Cl.
CPC .............. *H04W 4/44* (2018.02); *H04L 67/10* (2013.01); *H04L 67/12* (2013.01); *H04L 67/34* (2013.01); *B60R 16/023* (2013.01); *H04L 67/20* (2013.01)

(58) Field of Classification Search
CPC .......... H04W 4/44; H04L 67/10; H04L 67/12; H04L 67/34; H04L 67/20; B60R 16/023
(Continued)

(56) References Cited

U.S. PATENT DOCUMENTS 8,201,082 B1 *  6/2012  Nordstrom ............ G06F 16/958
                                                              715/234
8,983,719 B2    3/2015  Ukai
(Continued)

FOREIGN PATENT DOCUMENTS

| CN | 105493530 A | 4/2016 |
| JP | 5742781 B2 | 7/2015 |
| WO | WO 2004/098127 A | 11/2004 |

OTHER PUBLICATIONS

Chinese Office Action and Search Report dated Aug. 4, 2020 for Application No. 201780080918.3 along with an English translation of the Office Action.
(Continued)

*Primary Examiner* — Nicholas R Taylor
*Assistant Examiner* — Chong G Kim
(74) *Attorney, Agent, or Firm* — Birch, Stewart, Kolasch & Birch, LLP

(57) ABSTRACT

A vehicular information processing system includes a mobile communication terminal including a communication
(Continued)

unit for obtaining application software which uses vehicle information and configured to be provided with a functional unit by the application software, and an in-vehicle device configured to provide the mobile communication terminal with vehicle information to be used in at least two functional units, in response to an information acquisition request from the mobile communication terminal via a communication channel established between the in-vehicle device and the mobile communication terminal. The mobile communication terminal includes: an integrator for integrating information acquisition requests that include a common item, a transmitter for transmitting the integrated information acquisition requests to the in-vehicle device, and a receiver for receiving the vehicle information to be used in the at least two functional units from the in-vehicle device.

8 Claims, 13 Drawing Sheets

(58) Field of Classification Search
USPC .......................................................... 709/219
See application file for complete search history.

(56) References Cited

U.S. PATENT DOCUMENTS

| 2011/0012720 | A1* | 1/2011 | Hirschfeld | B60W 40/09 340/439 |
|---|---|---|---|---|
| 2013/0311037 | A1* | 11/2013 | Ukai | G07C 5/008 701/36 |
| 2015/0056976 | A1* | 2/2015 | Ukai | H04M 1/72577 455/418 |
| 2016/0049017 | A1* | 2/2016 | Busse | G07C 5/008 701/33.3 |
| 2016/0212253 | A1* | 7/2016 | Akama | G01C 21/3688 |
| 2018/0063280 | A1* | 3/2018 | Gay | H04L 67/2833 |

OTHER PUBLICATIONS

Extended European Search Report dated Nov. 4, 2019 issued to the corresponding European Application No. 17886108.4.

* cited by examiner

FIG. 12

| Function E unit | | Function F unit | | Function G unit | | Function H unit | |
|---|---|---|---|---|---|---|---|
| Requested information | Update cycle | Requested information | Update cycle | Requested information | Update cycle | Requested information | Update cycle |
| Vehicle speed | 100 ms | Vehicle speed | 500 ms | Vehicle speed | 200 ms | Vehicle speed | 500 ms |
| Remaining fuel amount | 200 ms | Remaining fuel amount | 500 ms | Location information | 100 ms | Remaining fuel amount | 500 ms |
| Location information | 100 ms | Location information | 500 ms | Instantaneous fuel consumption | 100 ms | Location information | 500 ms |
| Instantaneous fuel consumption | 500 ms | | | Model year of vehicle | 1000 ms | | |

FIG. 13

| Bulk request list | Update cycle |
|---|---|
| Vehicle speed | 100 ms |
| Remaining fuel amount | 200 ms |
| Location information | 100 ms |
| Instantaneous fuel consumption | 100 ms |

VEHICULAR INFORMATION PROCESSING SYSTEM, VEHICULAR INFORMATION PROCESSING PROGRAM, AND MOBILE COMMUNICATION TERMINAL THE SUPPRESSES EXCESSIVE INCREASE IN TRAFFIC BETWEEN MOBILE COMMUNICATION TERMINAL AND IN-VEHICULAR DEVICE

TECHNICAL FIELD

The present disclosure relates to a vehicular information processing system, a vehicular information processing program, and a mobile communication terminal.

BACKGROUND ART

Patent Document 1 discloses a vehicular device capable of executing a terminal application which has a function in common with an application loaded on a mobile communication terminal and can use services provided by an external server through operation in cooperation with a mobile communication terminal. This vehicular device includes a communication unit performing communication with the mobile communication terminal, a vehicle information acquisition unit acquiring vehicle information to be used in the terminal application, and a control unit setting the vehicle information to the terminal application and transmitting the set information to a server via the mobile communication terminal by the communication unit.

CITATION LIST

Patent Literature

Patent Document 1: JP5742781B

SUMMARY

Problems to be Solved

In the vehicular device disclosed in Patent Document 1, multiple functions (functional units) are added to the mobile communication terminal, and when information acquisition request including multiple items (location information, vehicle speed, etc.) is generated at each of the functional units at different timings, traffic (amount of information per unit time) between the mobile communication terminal and the vehicular device may increase. Accordingly, transmission and reception of information may be delayed, or transmission and reception of information may be disabled, so that each of the functional units may not be able to acquire necessary vehicle information at an appropriate timing.

In view of the above, an object of at least one embodiment of the present invention is to provide a vehicular information processing system, a vehicular information processing program, and a mobile communication terminal whereby it is possible to suppress an excessive increase in traffic between a mobile communication terminal and an in-vehicle device even in a case where multiple functional units are added to the mobile communication terminal which transmits and receives vehicle information to and from the in-vehicle device mounted on a vehicle.

Solution to the Problems

A vehicular information processing system according to at least one embodiment of the present invention comprises a mobile communication terminal including a communication unit for obtaining application software which uses vehicle information and configured to be provided with a functional unit added by the application software; and an in-vehicle device configured to provide the mobile communication terminal with vehicle information to be used in at least two functional units in response to an information acquisition request from the mobile communication terminal via a communication channel established between the in-vehicle device and the mobile communication terminal. The mobile communication terminal includes: an integrator for integrating information acquisition requests that include a common item among information acquisition requests issued from each of the at least two functional units; a transmitter for transmitting the integrated information acquisition requests to the in-vehicle device; and a receiver for receiving the vehicle information to be used in the at least two functional units from the in-vehicle device.

In some embodiments, the mobile communication terminal includes: a storage for storing the vehicle information received from the in-vehicle device at least until an update cycle of the integrated information acquisition requests ends; and an information distributor for distributing the vehicle information stored in the storage to a functional unit among the at least two functional units that has issued the information acquisition request that is to be integrated.

In some embodiments, the integrator is configured to set the update cycle of the integrated information acquisition requests to an update cycle that is the shortest among update cycles of the information acquisition requests that include the common item.

In some embodiments, the mobile communication terminal includes: a request verifier for verifying the information acquisition requests issued from each of the at least two functional units; a white-list storage storing a white list including a list of a functional unit permitted to request acquisition of information among the at least two functional units and a list of an item permitted to be requested; and a white-list checker for checking the at least two functional units and an item requested from the at least two functional units against the white list.

In some embodiments, the vehicular information processing system further comprises a white-list providing server for providing the white list, and the request verifier is configured to update the white list stored in the white-list storage to a white list obtained from the white-list providing server by the communication unit.

A vehicular information processing program according to at least one embodiment of the present invention is configured to cause a mobile communication terminal including at least two functional units, which use vehicle information received from an in-vehicle device mounted on a vehicle via a communication channel established between the mobile communication terminal and the in-vehicle device, to execute: an integration step of integrating information acquisition requests that include a common item among information acquisition requests issued from each of the at least two functional units; a transmission step of transmitting the integrated information acquisition requests to the in-vehicle device; a reception step of receiving the vehicle information transmitted from the in-vehicle device in response to the information acquisition requests transmitted in the transmission step; and a distribution step of distributing the vehicle information received in the reception step to a request source of the information acquisition request among the at least two functional units.

In some embodiments, the transmission step includes setting an update cycle of the integrated information acquisition requests to an update cycle that is the shortest among update cycles of the information acquisition requests that include the common item.

A mobile communication terminal according to at least one embodiment of the present invention includes a communication unit for obtaining application software which uses vehicle information and is configured to be provided with a functional unit added by the application software. The mobile communication terminal comprises: an establisher for establishing a communication channel between the mobile communication terminal and an in-vehicle device mounted on a vehicle and configured to obtain vehicle information; an integrator for integrating a plurality of information acquisition requests that include a common item among information acquisition requests issued to the in-vehicle device from each of at least two functional units; a transmitter for transmitting the integrated information acquisition requests to the in-vehicle device; and a receiver for receiving the vehicle information to be used in the at least two functional units from the in-vehicle device.

In some embodiments, the mobile communication terminal includes: a storage for storing the vehicle information received from the in-vehicle device at least until an update cycle of the integrated information acquisition requests ends; and an information distributor for distributing the vehicle information stored in the storage to a functional unit among the at least two functional units that has issued each of the information acquisition requests that is to be integrated.

In some embodiments, the integrator is configured to set the update cycle of the integrated information acquisition requests to an update cycle that is the shortest among update cycles of the information acquisition requests that include the common item.

Advantageous Effects

According to at least one embodiment of the present invention, it is possible to suppress an excessive increase in traffic between a mobile communication terminal and an in-vehicle device even in a case where multiple functional units are added to the mobile communication terminal which transmits and receives vehicle information to and from the in-vehicle device.

BRIEF DESCRIPTION OF DRAWINGS

FIG. 12 is a diagram organizing and showing information requested by functions E to H and updating cycles.

FIG. 13 is a diagram organizing and showing information collectively requested by functions E to G and updating cycles.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
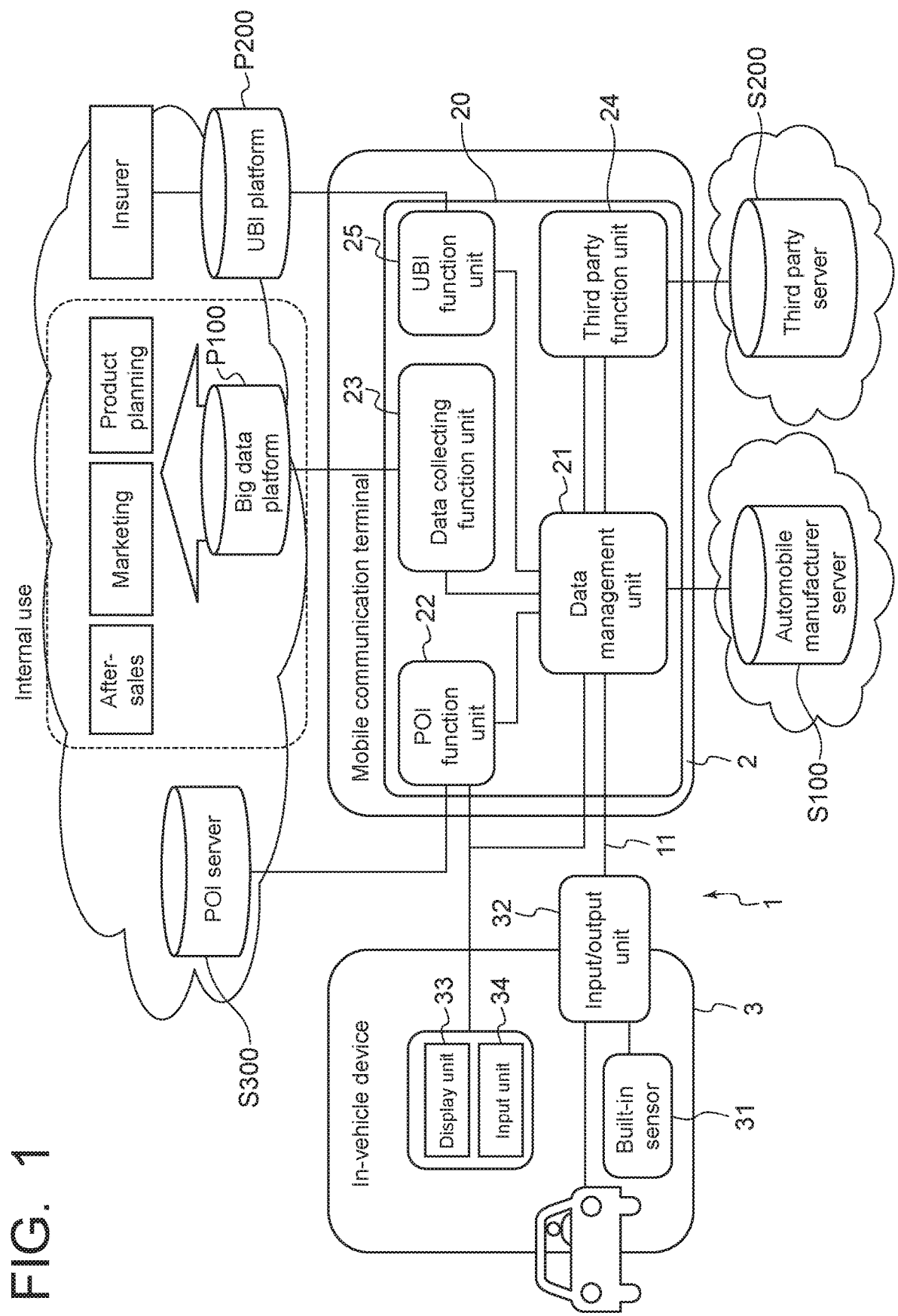
FIG. 1 is a schematic block diagram showing a control configuration of a vehicular information processing system according to an embodiment of the present invention.
Figure 2:
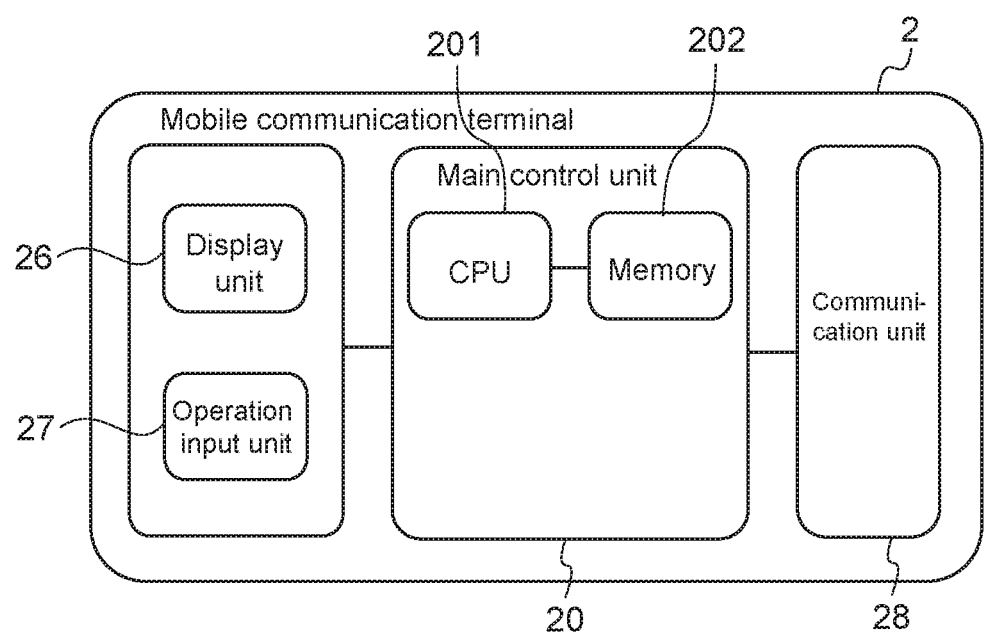
FIG. 2 is a schematic block diagram showing the overall configuration of a mobile communication terminal shown in FIG. 1.
Figure 3:
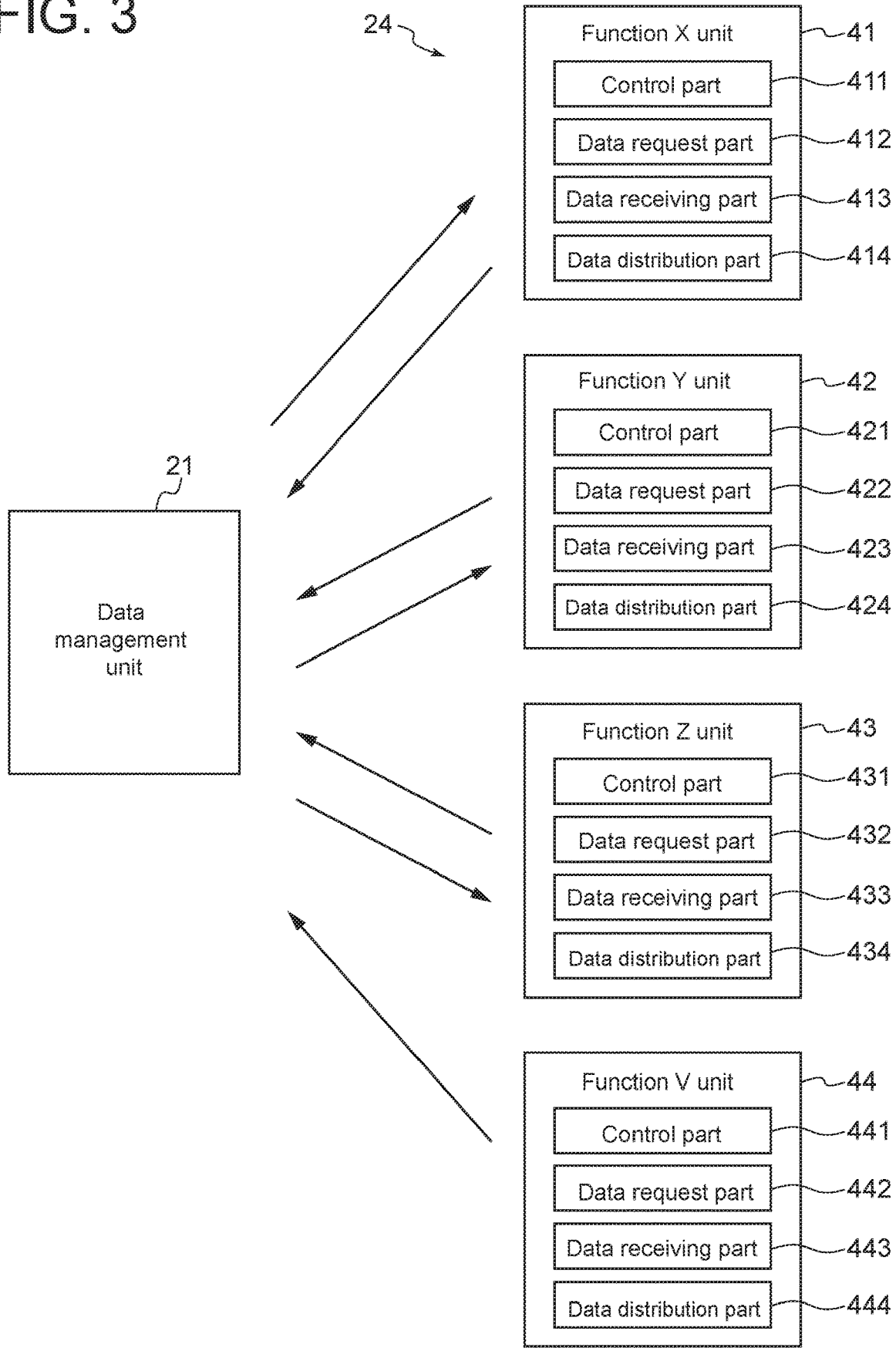
FIG. 3 is a schematic block diagram showing the configuration of a part of the mobile communication terminal shown in FIG. 1.

FIG. 1 is a schematic block diagram showing a configuration of a vehicular information processing system 1 according to an embodiment of the present invention. FIG. 2 is a schematic block diagram showing the overall configuration of a mobile communication terminal 2 shown in FIG. 1. FIG. 3 is a schematic block diagram showing the configuration of a part of the mobile communication terminal shown in FIG. 1.

As shown in FIG. 1, the vehicular information processing system 1 according to an embodiment of the present invention includes a mobile communication terminal 2 and an in-vehicle device 3. The mobile communication terminal 2 is a so-called smart phone and can establish a communication channel with an external server S100, S200, S300 and an external platform P100, P200. Although not depicted in FIG. 1 for convenience, communication with the external server and the external platform is performed by a communication unit 28 of the mobile communication terminal 2 (see FIG. 2).

The server includes, for instance, a server S100 of automobile manufacturer (hereinafter, referred to as "automobile manufacturer server S100"), a server S200 of third party (hereinafter, referred to as "third party server S200"), and a server S300 of Point Of Interest (POI) (hereinafter, referred to as "POI server S300").

The automobile manufacturer server S100 is a server operated and managed by an automobile manufacturer or a vendor entrusted by an automobile manufacturer (hereinafter, referred to as "automobile manufacturer or the like"), and stores the latest version of a white list described later. For instance, the server may store various information provided by the automobile manufacturer or application software (hereinafter, also referred to as "app" or "application") provided by the automobile manufacturer. The application software provided by the automobile manufacturer includes, for instance, a gateway application and a data collecting application.

The third party server S200 is a server operated and managed by a third party (other than the automobile manufacturer or the like and the user), and stores, for instance, various information provided by the third party or application software provided by the third party. The application software provided by the third party includes, for instance, a fuel consumption calculation application, a driving diagnosis application, and a POI application (hereinafter, also referred to as function X application, function Y application, and function Z application, etc.). Further, the third party server S200 may also store various information provided by the automobile manufacturer or application software provided by the automobile manufacturer.

Further, the application software provided by the third party may include a schedule management application for managing a schedule of events performed in various places, and may display the schedule on a map in cooperation with a map application for managing location information.

POI is a specific place that someone finds convenient or interesting. The POI server S300 is a server operated and managed by a provider who provides POI information, and stores, for instance, various information provided by the provider who provides POI information.

The platform includes, for instance, a platform P100 for big data (hereinafter, referred to as "big data platform P100") and a platform P200 for Usage Based Insurance (UBI) (hereinafter, referred to as "UBI platform P200").

The big data platform P100 is a portion which functions as a basis for utilizing big data. Various information collected via the big data platform P100 is used for after-sales, marketing, and product planning in the automobile manufacturer.

UBI is vehicle insurance whereby premium is determined based on how a driver is driving. The UBI platform P200 is a portion which functions as a basis for determining the premium. Various information collected via the UBI platform P200 is used for determining the premium in the insurer.

As shown in FIG. 2, the mobile communication terminal 2 includes a main control unit 20 which controls the entire terminal, a display unit 26 which displays various character information and images, an operation input unit 27 to which an operation by the user is input, and a communication unit 28 which communicates with various servers. The main control unit 20 includes a central processing unit (CPU) 201 as an information processing device and a memory 202 composed of various non-volatile recording media. The CPU 201 operates in accordance with various programs stored in the memory 202. The display unit 26 and the operation input unit 27 are a touch panel including a liquid crystal display. Various application software downloaded (obtained) from various servers by the communication unit 28 is stored in the memory 202. For instance, the mobile communication terminal 2 can download a white list, which is described later, from the automobile manufacturer server S100. Further, the mobile communication terminal 2 can download application software such as a function X application provided by the third party from the third party server S200, a gateway application produced by the automobile manufacturer, or a UBI application produced by the insurer.

Various functional units are added to the mobile communication terminal 2 by downloaded pieces of application software. More specifically, in the mobile communication terminal 2, a gateway application or other applications downloaded by the CPU 201 are executed; in the present embodiments, it is interpreted that, by adding a corresponding application, a functional unit for executing a function implemented by the application is added to the main control unit 20.

For instance, a data management unit 21 is added to the main control unit 20 of the mobile communication terminal 2 by a gateway application downloaded from the third party server S200, a POI function unit 22 is added by a POI application, and a data collecting function unit 23 is added by a data collecting application.

The data management unit 21 manages an information acquisition request (input) from other functional units and manages information (output) provided by the in-vehicle device 3.

The POI function unit 22 acquires location information of the vehicle from the in-vehicle device 3 and, on the other hand, accesses the POI server S300 via the communication unit 28 as needed and provides the location information or the like of the vehicle thereto to acquire information regarding facilities in the vicinity of the current location (vehicle location) which the user is likely to be interested in. Further, the POI function unit 22 displays the information regarding facilities the user is likely to be interested in on a map in cooperation with a map function of the mobile communication terminal 2.

The data collecting function unit 23 acquires vehicle information from the in-vehicle device 3 and accesses the big data platform P100 as needed via the communication unit 28 to provide the big data platform P100 with the vehicle information.

Additionally, for instance, third party function units 24 such as a function X unit 41, a function Y unit 42, a function Z unit 43, and a function V unit 44 are added to the mobile communication terminal 2 by applications such as a function X application, a function Y application, a function Z application, and a function V application provided by the third party and downloaded from the third party server S200 (see FIG. 3).

Additionally, for instance, a UBI function unit 25 is added to the mobile communication terminal 2 by a UBI application downloaded from the third party server S200.

The UBI function unit 25 acquires vehicle information from the in-vehicle device 3 and accesses the UBI platform P200 as needed via the communication unit 28 to provide the UBI platform P200 with the vehicle information (characteristics of a driver).

The functional units such as the POI function unit 22, the data collecting function unit 23, and the UBI function unit 25 added to the mobile communication terminal 2 implement respective functions by using information (vehicle information) obtained from the vehicle. Accordingly, each of the functional units 22, 23, 25 requests the in-vehicle device 3 to acquire vehicle information.

Further, the third party function units 24 such as the function X unit 41, the function Y unit 42, the function Z unit 43, and the function V unit 44 added to the mobile communication terminal 2 implement respective functions by using information (vehicle information) obtained from the vehicle, like the POI function unit 22, the data collecting function unit 23, and the UBI function unit 25. Accordingly, each of the functional units 41, 42, 43, 44 requests the in-vehicle device 3 to acquire vehicle information.

The request for acquisition of vehicle information includes items of information to be acquired, and the acquisition of vehicle information is requested in an update cycle which is determined for each item. The items of information to be acquired include, for instance, vehicle speed, remaining fuel amount, location information, instantaneous fuel consumption, and model year of the vehicle. The items included in the requested vehicle information to be acquired may vary among the functional units, or a part or the whole of the items included in the requested vehicle information may be common.

As shown in FIG. 3, each of the function X unit 41, the function Y unit 42, the function Z unit 43, and the function V unit 44 includes a control part 411, 421, 431, 441, a data request part 412, 422, 432, 442, a data receiving part 413, 423, 433, 443, and a data distribution part 414, 424, 434, 444.

Each control part 411, 421, 431, 441 is a portion which performs control for implementing each function and can collectively control the data request part 412, 422, 432, 442, the data receiving part 413, 423, 433, 443, and the data distribution part 414, 424, 434, 444.

The data request part 412, 422, 432, 442 is a portion which requests vehicle information for implementing the function and can set items of information to be requested and an update cycle determined for each item.

The data receiving part 413, 423, 433, 443 is a portion which receives the vehicle information transmitted in response to the request from the data request part 412, 422, 432, 442.

The data distribution part 414, 424, 434, 444 is a portion which distributes data to the third party server S200 in a case where each functional unit (function X unit 41, function Y unit 42, function Z unit 43, and function V unit 44) cooperates with the third party server S200. The data distribution part 414, 424, 434, 444 is not essential in a case where the function does not cooperate with the third party server S200.

The in-vehicle device 3 is also referred to as a head unit, for instance, and includes a display (display device). For instance, a sensor (built-in sensor) 31 such as a GPS sensor, an acceleration sensor, a gyroscope, and a direction sensor is incorporated in the in-vehicle device 3. The in-vehicle device 3 can acquire information (vehicle information) regarding the vehicle such as the location of the vehicle, the acceleration of the vehicle, the inclination of the vehicle, and the traveling direction of the vehicle, from such a sensor 31. Further, the in-vehicle device 3 can acquire information (vehicle information) regarding the vehicle such as the accumulated travel distance, remaining fuel, distance to empty, engine rotational speed, and instantaneous fuel consumption from each control device (ECU) which controls the vehicle.

The in-vehicle device 3 includes an input/output unit 32 and can establish a communication channel with the mobile communication terminal 2. The in-vehicle device 3 and the mobile communication terminal 2 can establish a communication channel by, for instance, wired connection. The wired connection is made by, for instance, a cable 11 of universal serial bus (USB) standard, but the wired connection is not limited to connection by the USB standard cable.

The in-vehicle device 3 and the mobile communication terminal 2 may establish a communication channel by wireless connection. The wireless connection may be made by wireless USB, Bluetooth (registered trademark) or the like, but the wireless connection is not limited to the wireless communication established by these standards.

The in-vehicle device 3 can provide the mobile communication terminal 2 with vehicle information to be used in at least two functional units in response to the information acquisition request from the mobile communication terminal 2.

The at least two functional units include, besides functional units added by application software downloaded from the automobile manufacturer server S100 such as the POI function unit 22 and the data collecting function unit 23, functional units added by application software downloaded from the third party server S200 such as the third party function unit 24 (e.g., function X unit 41, function Y unit 42, function Z unit 43, and function V unit 44). Further, the at least two functional units include functional units added by application software downloaded from the automobile manufacturer server S100 or the third party server S200 such as the UBI function unit 25.

The mobile communication terminal 2 includes the data management unit 21. The data management unit 21 is added by the gateway application downloaded from the automobile manufacturer server S100, as described above.

Figure 5:
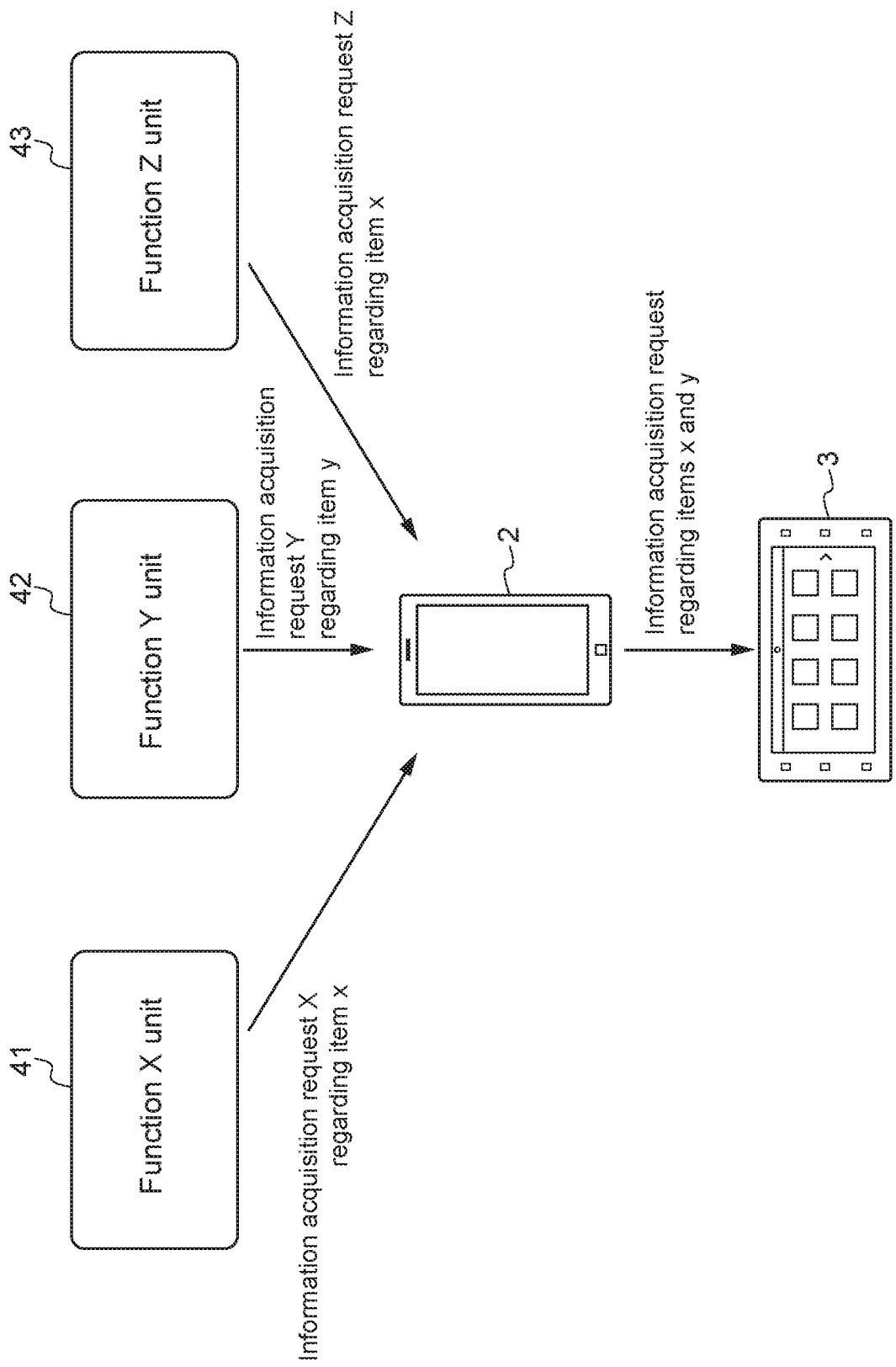
FIG. 5 is a conceptual diagram illustrating that information requested by multiple functional units is organized in a request integrator and a request is collectively issued.

The data management unit 21 integrates multiple information acquisition requests including a common item among information acquisition requests issued from each of the at least two functional units into a single information acquisition request. For instance, as shown in FIG. 5, if two or more third party function units 24, for instance, the function X unit 41, the function Y unit 42, and the function Z unit 43 are added by application software from the third party server S200, and the function X unit 41, the function Y unit 42, and the function Z unit 43 request vehicle information X, Y, and Z, the data management unit 21 integrates, among the requested vehicle information X, Y, Z (hereinafter, referred to as "information acquisition requests X, Y, Z"), information acquisition requests regarding item x in the information acquisition requests X and Z, which include item x in common, into a single information acquisition request regarding item x. Thereby, the mobile communication terminal 2 requests the in-vehicle device 3 for vehicle information of items x and y.

Figure 6:
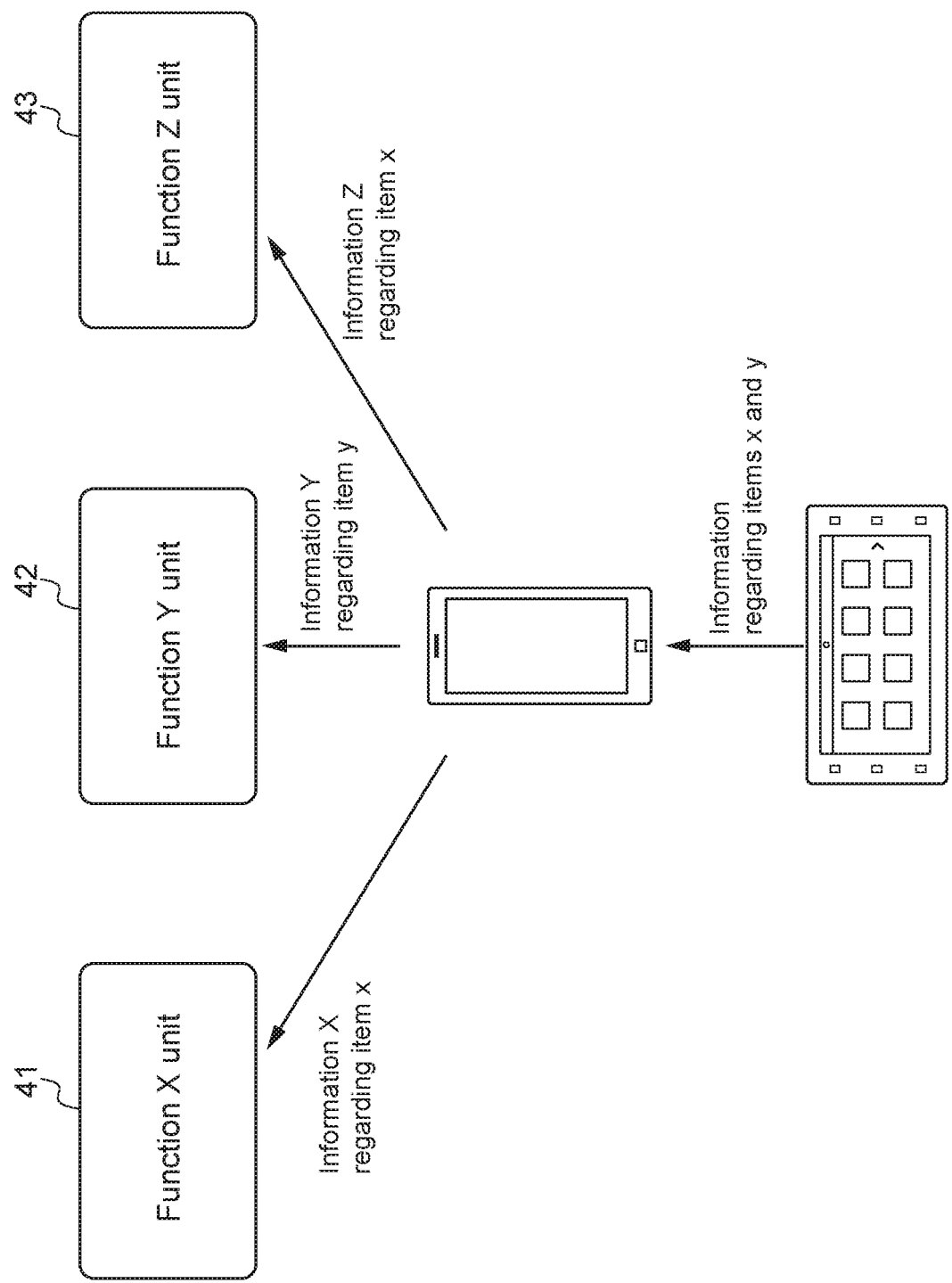
FIG. 6 is a conceptual diagram illustrating that requested information collectively acquired is distributed to respective request sources by an information distributor.

Further, the mobile communication terminal 2 is provided with vehicle information to be used in the at least two functional units from the in-vehicle device 3. For instance, as shown in FIG. 6, in response to a request from the mobile communication terminal 2, the in-vehicle device 3 provides the mobile communication terminal 2 with vehicle information (items x and y) to be used in the function X unit 41, the function Y unit 42, and the function Z unit 43. Thereby, the data management unit 21 distributes, to the function X unit 41, vehicle information (hereinafter, referred to as "vehicle information X") including item x to be used in the function X unit 41 and distributes, to the function Y unit 42, vehicle information (hereinafter, referred to as "vehicle information Y") including item y to be used in the function Y unit 42. Further, the data management unit 21 distributes, to the function Z unit 43, vehicle information (hereinafter, referred to as "vehicle information Z") including item x to be used in the function Z unit 43.

In the above embodiment, the data management unit 21 integrates multiple information acquisition requests including a common item among information acquisition requests from each of the at least two functional units into a single information acquisition request (item). For instance, in the example shown in FIG. 5, among information acquisition requests X, Y, and Z issued from the function X unit 41, the function Y unit 42, and the function Z unit 43 respectively, information acquisition requests regarding item x in multiple information acquisition requests X and Z, which include item x in common, are integrated into a single information acquisition request regarding item x.

Further, the data management unit 21 receives vehicle information to be used in the at least two functional units provided by the in-vehicle device 3. For instance, in the example shown in FIG. 6, in response to a request from the mobile communication terminal 2, the in-vehicle device 3 provides the mobile communication terminal 2 with vehicle information (items x and y) to be used in the function X unit 41, the function Y unit 42, and the function Z unit 43.

Thereby, it is possible to suppress traffic between the mobile communication terminal 2 and the in-vehicle device 3 even in a case where multiple functional units are added to the mobile communication terminal 2. As a result, it is possible to acquire necessary vehicle information at an appropriate timing for each of the multiple functional units.

Figure 4:
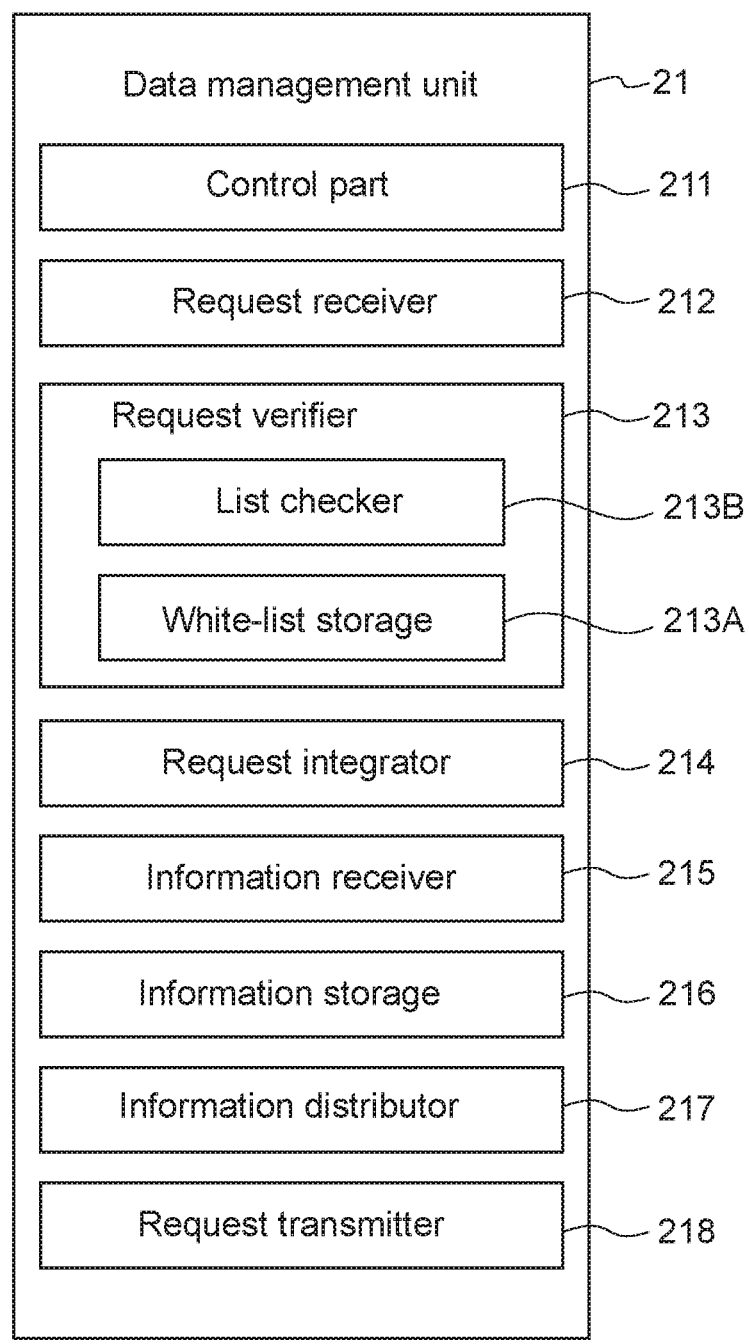
FIG. 4 is a schematic block diagram showing the configuration of a data management unit according to an embodiment.

As shown in FIG. 4, the data management unit 21 according to an embodiment includes a control part 211, a request receiver 212, a request verifier 213, a request integrator 214, a request transmitter 218, an information receiver 215, an information storage 216, and an information distributor 217.

The control part 211 is a portion which performs control for implementing a function of the data management unit 21 and can collectively control the request receiver 212, the request verifier 213, the request integrator 214, the information receiver 215, the information storage 216, and the information distributor 217.

The request receiver 212 is a portion which receives an information acquisition request from each functional unit.

The request verifier 213 can verify the information acquisition request issued from each of the at least two functional units and received by the request receiver 212. For instance, the request verifier 213 can verify whether a request source of the information acquisition request and an item of information requested in the information acquisition request are appropriate.

The request integrator 214 can integrate multiple information acquisition requests including a common item among the information acquisition requests verified by the request verifier 213 into a single information acquisition request. For instance, the request integrator 214 can integrate information acquisition requests regarding an item common to multiple information acquisition requests among a plurality of information acquisition requests, to form a single information acquisition request regarding the item. The request transmitter 218 transmits the information acquisition request integrated by the request integrator 214 to the in-vehicle device 3.

The information receiver 215 is a portion which receives vehicle information provided by the in-vehicle device 3 in response to the request from the data management unit 21.

The information storage 216 is a portion which stores the vehicle information received by the information receiver 215 and can store the vehicle information at least until an update cycle of the vehicle information ends.

The information distributor 217 can distribute the vehicle information stored in the information storage 216 to a request source of the information acquisition request verified by the request verifier 213 among the at least two functional units. Note that the respective parts do not exist separately; when the gateway application is executed by the CPU 201, the CPU 201 executing a process of receiving the information acquisition request from each functional unit is merely regarded as the request receiver 212 for convenience.

In the above embodiment, since the request verifier 213 verifies the information acquisition request issued from each of the at least two functional units, the request verifier 213 can permit only an appropriate functional unit to request acquisition of information. For instance, since the request verifier 213 verifies whether a request source of the information acquisition request and an item of information requested in the information acquisition request are appropriate, it is possible to permit only an appropriate functional unit to request acquisition of information regarding an appropriate item. The term "appropriate" used herein means that an information acquisition request is issued from a permitted function unit, and that an item included in the information acquisition request is permitted. By determining the appropriateness in this way, it is possible to prevent information from being leaked even in a case an inappropriate information acquisition request is issued from an application produced by a malicious producer.

The request integrator 214 integrates multiple information acquisition requests including a common item among the information acquisition requests verified by the request verifier 213 into a single information acquisition request. Thus, the request integrator 214 can suppress traffic between the mobile communication terminal 2 and the in-vehicle device 3 even in a case where multiple functional units are added to the mobile communication terminal 2. For instance, the request integrator 214 integrates an information acquisition request regarding an item common to multiple information acquisition requests including the common item among a plurality of information acquisition requests into a single information acquisition request regarding the item, and the integrated request is transmitted by the request transmitter 218. Thus, the request integrator 214 can suppress an excessive increase in traffic between the mobile communication terminal 2 and the in-vehicle device 3 even in a case where multiple functional units are added to the mobile communication terminal 2. Consequently, the data management unit 21 can acquire necessary vehicle information at an appropriate timing for each of the multiple functional units, compared with a conventional one.

The information storage 216 responds to the request of the request integrator 214 and stores the vehicle information provided by the in-vehicle device 3 at least until an update cycle of the vehicle information ends. Thus, the information storage 216 can respond to the information acquisition request from each of the at least two functional units at different timings.

The information distributor 217 distributes the vehicle information stored in the information storage 216 to a request source of the information acquisition request verified by the request verifier 213 among the at least two functional units. Thus, the information distributor 217 can distribute the vehicle information only to an appropriate functional unit.

The request integrator 214 according to an embodiment integrates, among information acquisition requests from the at least two functional units, information acquisition requests regarding an item common to information acquisition requests including the common item into a single information acquisition request regarding the item.

For instance, as shown in FIG. 12, if vehicle information E, F, and G are requested from a function E unit, a function F unit, and a function G unit, the data management unit 21 integrates, among the requested vehicle information E, F, and G (hereinafter, referred to as "information acquisition requests E, F, and G"), information acquisition requests regarding the item "vehicle speed" in the information acquisition requests E, F, and G which include the item "vehicle speed" in common, into a single information acquisition request regarding the item "vehicle speed" (see FIG. 13).

Further, for instance, as shown in FIG. 12, the data management unit 21 integrates, among the information acquisition requests E, F, and information acquisition requests regarding the item "remaining fuel amount" in the information acquisition requests E and which include the item "remaining fuel amount" in common, into a single information acquisition request regarding the item "remaining fuel amount" (see FIG. 13).

Further, for instance, as shown in FIG. 12, the data management unit 21 integrates, among the information acquisition requests E, F, and information acquisition requests regarding the item "location information" in the information acquisition requests E and F, which include the item "location information" in common, into a single information acquisition request regarding the item "location information" (see FIG. 13).

Further, for instance, as shown in FIG. 12, the data management unit 21 integrates, among the information acquisition requests E, F, and information acquisition requests regarding the item "instantaneous fuel consumption" in the information acquisition requests E and which include the item "instantaneous fuel consumption" in common, into a single information acquisition request regarding the item "instantaneous fuel consumption" (see FIG. 13).

The request integrator 214 according to an embodiment sets the update cycle of the single information acquisition request to an update cycle that is the shortest among update cycles of the multiple information acquisition requests including the common item.

For instance, as shown in FIG. 12, when the update cycle of the item "vehicle speed" of the information acquisition request E is 100 ms, the update cycle of the item "vehicle speed" of the information acquisition request F is 500 ms, and the update cycle of the item "vehicle speed" of the information acquisition request G is 200 ms, the update cycle of the information acquisition request regarding the item "vehicle speed" is set to the shortest update cycle, namely 100 ms (see FIG. 13).

Further, for instance, as shown in FIG. 12, when the update cycle of the item "remaining fuel amount" of the information acquisition request E is 200 ms, and the update cycle of the item "remaining fuel amount" of the information acquisition request F is 500 ms, the update cycle of the information acquisition request regarding the item "remaining fuel amount" is set to the shortest update cycle, namely 200 ms (see FIG. 13).

Further, for instance, as shown in FIG. 12, when the update cycle of the item "instantaneous fuel consumption" of the information acquisition request E is 500 ms, and the update cycle of the item "instantaneous fuel consumption" of the information acquisition request G is 100 ms, the update cycle of the information acquisition request regarding the item "instantaneous fuel consumption" is set to the shortest update cycle, namely 100 ms (see FIG. 13).

In the above embodiment, since the request integrator 214 sets the update cycle of the single information acquisition request to the shortest update cycle among those of the multiple information acquisition requests including the common item, the request integrator 214 can respond to the information acquisition request including the item of the shortest update cycle.

The request verifier 213 according to an embodiment can check the information acquisition request from the functional unit against a white list including a list of a request source permitted to request acquisition of information and a list of a permitted information acquisition request for each request source. That is, it is possible to determine whether an application of the request source and a requested item are appropriate.

Figure 7:
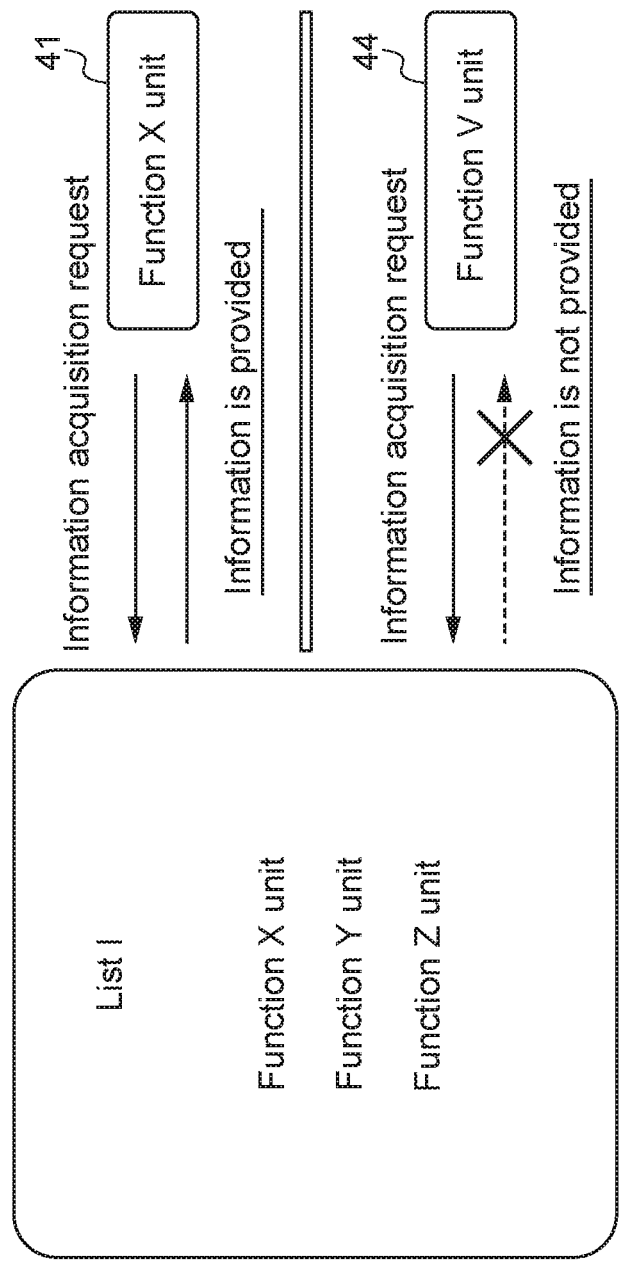
FIG. 7 is a conceptual diagram illustrating that verification is performed for each function by a list checker.

For instance, as shown in FIG. 7, if a list (white list I) of a request source permitted to request acquisition of information contains a function X unit, a function Y unit, and a function Z unit but does not contain a function Z unit, an information acquisition request from the function X unit 41 is permitted, while an information acquisition request from the function V unit 44 is not permitted (prohibited).

Figure 8:
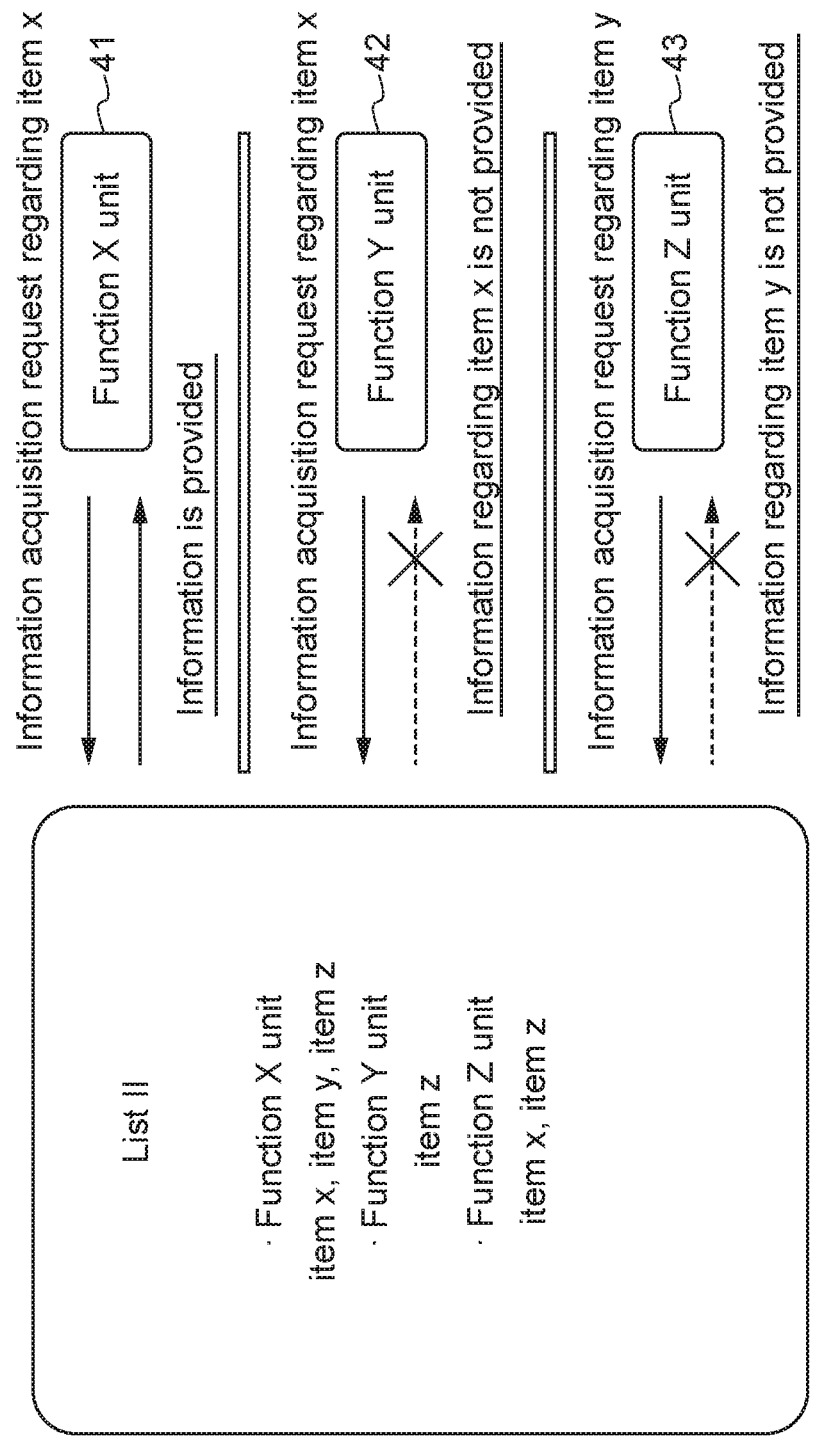
FIG. 8 is a conceptual diagram illustrating that verification is performed for each type of information by a list checker.

Further, for instance, as shown in FIG. 8, if a list (white list II) of an item regarding which an information acquisition request is permitted for each request source contains items x, y, and z for the function X unit, item z for the function Y unit, and items x, z for the function Z unit, an information acquisition request for item x from the function X unit 41 is permitted. On the other hand, regarding an information acquisition request regarding item x from the function Y unit 42, an information acquisition request regarding item x is not permitted to the function Y unit. Moreover, an information acquisition request regarding item y from the function Z unit is not permitted (prohibited).

As shown in FIG. 4, the request verifier 213 according to an embodiment includes a white-list storage 213A and a list checker 213B.

The white-list storage 213A can store a list of a request source permitted to request acquisition of information among the at least two functional units and a list of an item regarding which an information acquisition request is permitted for each request source.

Figure 11:
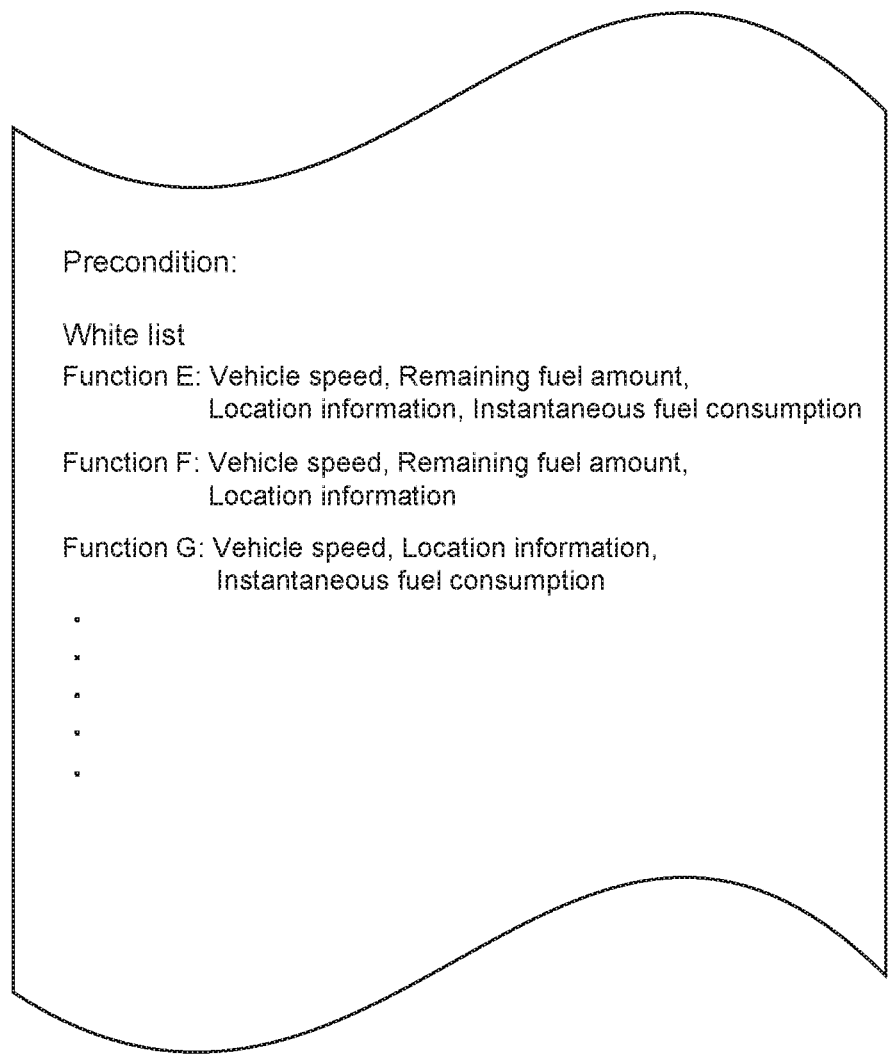
FIG. 11 is a schematic diagram showing contents of a white list.

For instance, in the example shown in FIG. 11, the list (white list) of a request source permitted to request acquisition of information contains a function E unit, a function F unit, and a function G unit but does not contain a function H unit. Further, for instance, the list (white list) of an item regarding which an information acquisition is permitted for each request source contains the items "vehicle speed", "remaining fuel amount", "location information", and "instantaneous fuel consumption" for the function E unit, the items "vehicle speed", "remaining fuel amount", and "location information" for the function F unit, and the items "vehicle speed", "location information", and "instantaneous fuel consumption" for the function G unit.

The list checker 213B can check the information acquisition request from each of the at least two functional units against the list of a request source permitted to request acquisition of information and the list of an item regarding which an information acquisition request is permitted for each request source stored in the white-list storage 213A.

For instance, in the example shown in FIG. 11, information acquisition requests from the function E unit, the function F unit, and the function G unit can be checked against the white list stored in the white-list storage 213A.

In this example, since the white list contains the function E unit, the function F unit, and the function G unit, an information acquisition request from the function X unit is authorized, and the information acquisition request is permitted. On the other hand, since the white list does not contain the function H unit, an information acquisition request from the function H unit is not authorized, and the information acquisition request is not permitted (prohibited).

Further, for instance, in the example shown in FIG. 11, information acquisition requests from the function E unit, the function F unit, and the function G unit can be checked against the white list stored in the white-list storage 213A. The information acquisition requests from the function E unit and the function F unit include the items "vehicle speed", "remaining fuel amount", "location information", and "instantaneous fuel consumption", and the information acquisition request from the function G unit includes the items "vehicle speed", "location information", "instantaneous fuel consumption", and "model year of vehicle".

In this example, since the white list contains the items "vehicle speed", "remaining fuel amount", "location information", and "instantaneous fuel consumption" for the function E unit, information acquisition requests regarding the items "vehicle speed", "remaining fuel amount", "location information", and "instantaneous fuel consumption" from the function E unit are authorized, and the information acquisition requests are permitted. On the other hand, since the white list contains only the items "vehicle speed", "location information", and "instantaneous fuel consumption" for the function G unit, an information acquisition request regarding the item "model year of vehicle" from the function G unit is not authorized, and the information acquisition request is not permitted (prohibited).

In the above embodiment, the list checker 213B checks the information acquisition request from each of the at least two functional units against the list of a request source permitted to request acquisition of information and the list of an item regarding which an information acquisition request is permitted for each request source stored in the white-list storage 213A. Thus, the list checking unit 213B can permit only an information acquisition request from an appropriate functional unit regarding an appropriate item.

The vehicular information processing system 1 according to an embodiment includes a server S100 as a white-list providing server. The white-list providing server can store a list of a request source permitted to request acquisition of information and a list of an item regarding which an information acquisition request is permitted for each request source.

In the above embodiment, the mobile communication terminal 2 can download the list of a request source permitted to request acquisition of information and the list of an item regarding which an information acquisition request is permitted for each request source, from the white-list providing server.

Additionally, in the above embodiment, the data management unit 21 can update the list of a request source permitted to request acquisition of information and the list of an item regarding which an information acquisition request is permitted for each request source stored in the white-list storage 213A to the downloaded list of request sources permitted to request acquisition of information and the downloaded list of an item regarding which an information acquisition request is permitted for each request source.

In the above embodiment, the data management unit 21 updates the list of a request source permitted to request acquisition of information and the list of an item regarding which an information acquisition request is permitted for each request source stored in the white-list storage 213A to the downloaded list of a request source permitted to request acquisition of information and the downloaded list of an item regarding which an information acquisition request is permitted for each request source. Thereby, it is possible to update the list of a request source permitted to request acquisition of information and the list of an item regarding which an information acquisition request is permitted for each request source stored in the white-list storage 213A to the latest lists.

As shown in FIG. 1, in the vehicular information processing system 1 according to an embodiment, each of the mobile communication terminal 2 and the in-vehicle device 3 includes a display unit 26, 33 and an operation input unit 27, 34.

In this embodiment, when a communication channel is established between the mobile communication terminal 2 and the in-vehicle device 3, an output to the display unit 26 of the mobile communication terminal 2 is enabled to be output on the display unit 33 of the in-vehicle device 3, and an input to the operation input unit 27 of the mobile communication terminal 2 is enabled to be input from the operation input unit 34 of the in-vehicle device 3. On the other hand, the output to the display unit 26 of the mobile communication terminal 2 is invalidated, and the input from the operation input unit 27 of the mobile communication terminal 2 is invalidated.

For instance, when the mobile communication terminal 2 and the in-vehicle device 3 are connected with the USB standard cable 11 so that a communication channel is established between the mobile communication terminal 2 and the in-vehicle device 3, an output to the display unit 26 of the mobile communication terminal 2 is enabled to be output on the display unit 33 of the in-vehicle device 3, and an input to the operation input unit 27 of the mobile communication terminal 2 is enabled to be input from the operation input unit 34 of the in-vehicle device 3. Further, the output to the display unit 26 of the mobile communication terminal 2 is invalidated, and the input from the operation input unit 27 of the mobile communication terminal 2 is invalidated.

In the above embodiment, when a communication channel is established between the mobile communication terminal 2 and the in-vehicle device 3, the vehicular information processing system 1 causes the output to the display unit 26 of the mobile communication terminal 2 to be output on the display unit 33 of the in-vehicle device 3, and causes the input to the operation input unit 27 of the mobile communication terminal 2 to be input from the operation input unit 34 of the in-vehicle device 3, and, on the other hand, invalidates the output to the display unit 26 of the mobile communication terminal 2, and invalidates the input from the operation input unit 27 of the mobile communication terminal 2. Thus, when a communication channel is established between the mobile communication terminal 2 and the in-vehicle device 3, the vehicular information processing system 1 causes a display on the display unit 26 of the mobile communication terminal 2 to disappear and disables operation input from the operation input unit. Thus, the vehicular information processing system 1 can control the operation of the mobile communication terminal 2 during driving of an automobile.

Figure 9:
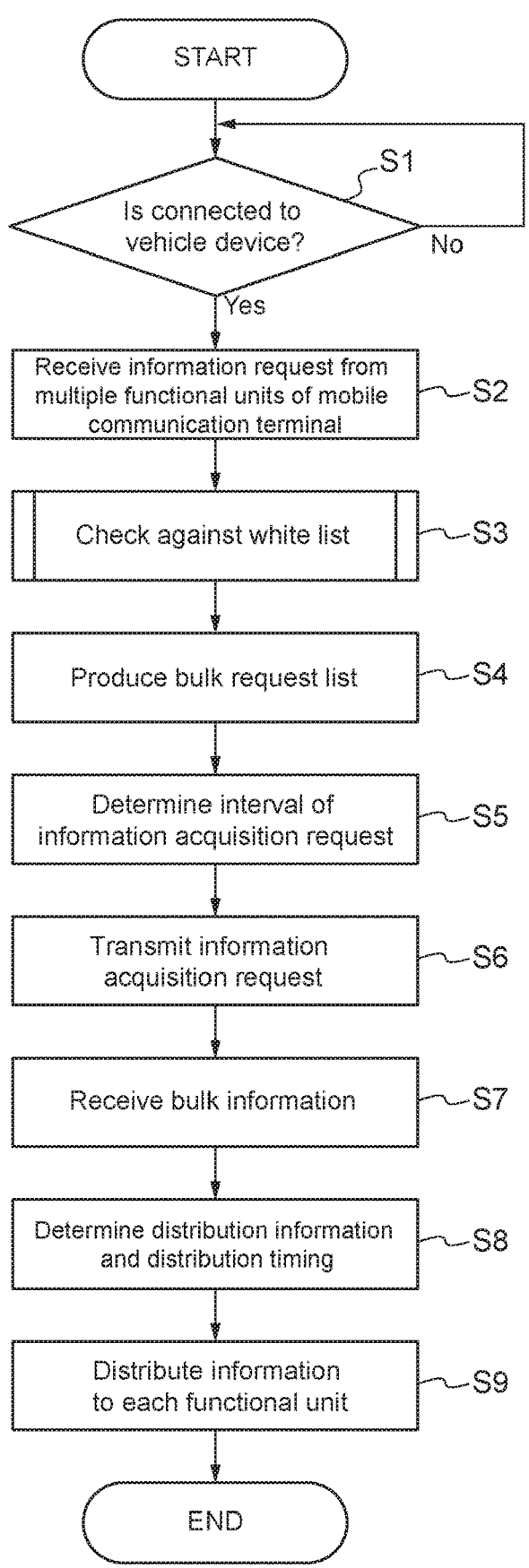
FIG. 9 is a flowchart schematically showing a control procedure of a vehicle information management system according to an embodiment of the present invention.

As shown in FIG. 9, the vehicular information processing program according to an embodiment of the present invention causes the mobile communication terminal 2 to execute an integration step (steps S4, S5), a transmission step (step S6), a reception step (step S7), and a distribution step (step S8). This program is stored in the memory (storage medium) 202, read by the CPU 201, and executed. That is, the memory (storage medium) 202 is a computer-readable storage medium storing the vehicular information processing program.

In the integration step (steps S4, S5), multiple information acquisition requests including a common item among respective information acquisition requests issued from at least two functional units are integrated into a single integrated information acquisition request. Further, in the transmission step (step S6), the integrated information acquisition request can be transmitted to the in-vehicle device 3.

In the reception step (step S7), vehicle information transmitted from the in-vehicle device 3 in response to the information acquisition request transmitted in the transmission step (step S6) can be received. Further, in the reception step (step S7), vehicle information to be used in the at least two functional units can be provided from the in-vehicle device 3.

In the distribution step (step S8), the vehicle information received in the reception step (step S7) can be distributed to a request source of the information acquisition request of the at least two functional units.

For instance, as shown in FIG. 9, when the vehicular information processing program is started by the CPU 201, first, it is determined whether the mobile communication terminal 2 is connected to the in-vehicle device 3 (step S1). If the mobile communication terminal 2 is connected to the in-vehicle device 3 (step S1: Yes) and a communication channel is established between the mobile communication terminal 2 and the in-vehicle device, the CPU 201 receives information acquisition requests from functional units by the request receiver 212 (step S2). In this embodiment, at least two functional units are activated, and information acquisition requests from the at least two functional units are received.

Next, the CPU 201 verifies the information acquisition requests from the functional units (hereinafter, referred to as "white list check") by the request verifier 213 (step S3).

Figure 10:
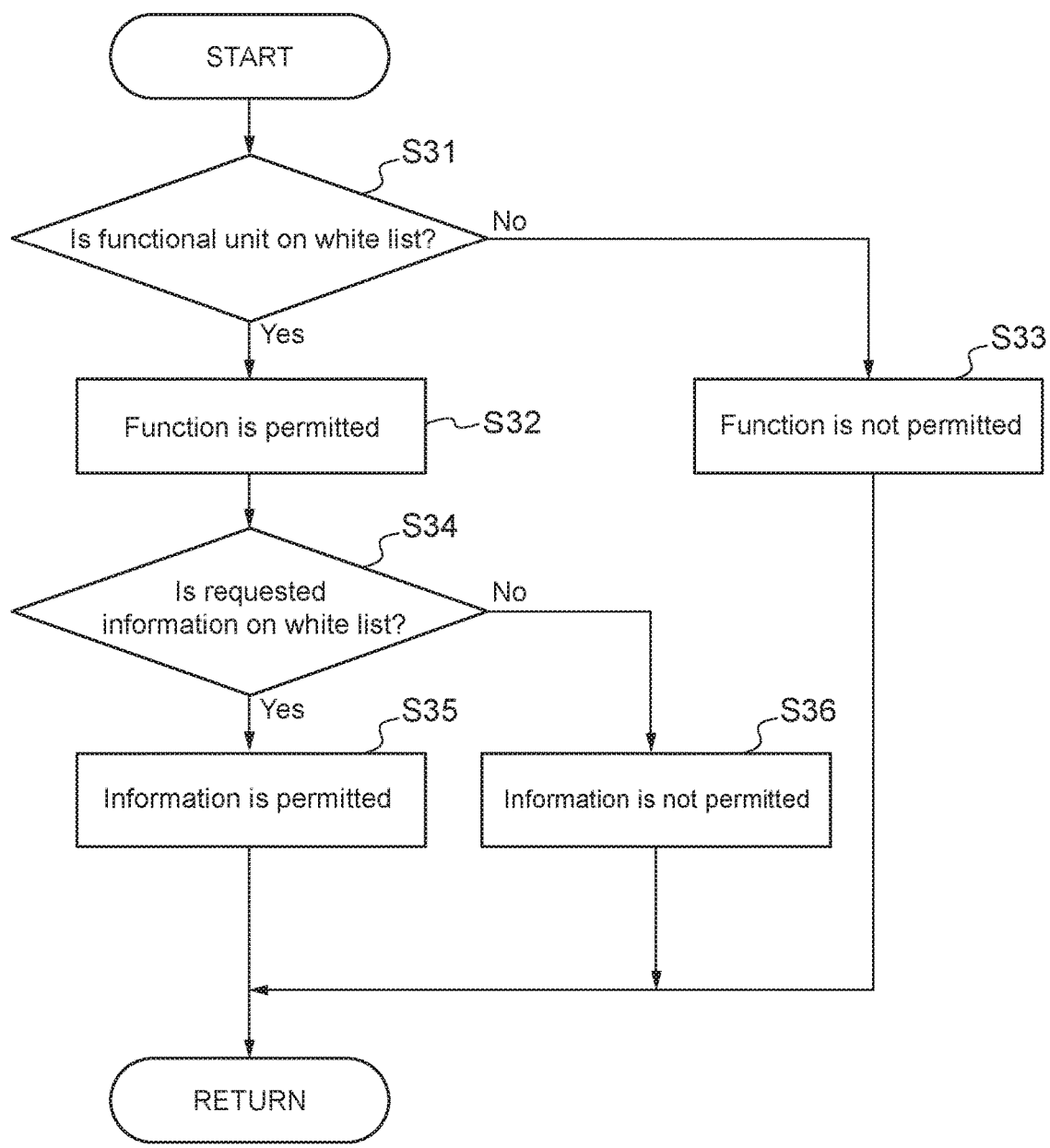
FIG. 10 is a flowchart schematically showing contents of white-list checking subroutine shown in FIG. 9.

In the white list check (step S3), for instance, as shown in FIG. 10, first, it is checked by the list checker 213B whether a request source of each information acquisition request is on the list of a request source (permitted to request acquisition of information) stored in the white-list storage 213A. If the functional unit which is the request source of the information acquisition request is on the list of a request source stored in the white-list storage 213A (step S31: Yes), the information acquisition request is permitted (step S32). If the functional unit which is the request source of the information acquisition request is not on the list of a request source stored in the white-list storage 213A (step S31: No), the information acquisition request is not permitted.

In the white list check (step S3), for instance, as shown in FIG. 10, if the information acquisition request is permitted, then, it is further checked by the list checker 213B whether an item of the information acquisition request is on the list of an item permitted for each request source stored in the white-list storage 213A. If the item of the information acquisition request is on the list of an item permitted for each request source stored in the white-list storage 213A (step S33: Yes), the information acquisition request is permitted (step S34). If the item of the information acquisition request is not on the list of an item permitted for each request source stored in the white-list storage 213A (step S34: No), the information acquisition request is not permitted.

If the information acquisition request from the functional unit is verified by the request verifier 213, then, the CPU 201 produces a bulk request list by the request integrator 214 (step S4). The bulk request list is produced by integrating information acquisition requests regarding an item common to information acquisition requests including the common item among respective information acquisition requests from the at least two functional units, into a single information acquisition request.

When the bulk request list is produced by the request integrator 214, then, the CPU 201 determines an information acquisition request interval by the request integrator 214 (step S5). For the information acquisition request interval, the update cycle of the single information acquisition request is set to the shortest update cycle among those of the multiple information acquisition requests including the common item.

When the information acquisition request interval is determined by the request integrator 214, then, the CPU 201 transmits the information acquisition request to the in-vehicle device 3 by the request transmitter 218 (step S6).

The information receiver 215 of the CPU 201 is provided with vehicle information to be used in the at least two functional units from the in-vehicle device 3 (step S7).

When the information receiver 215 of the CPU 201 is provided with vehicle information, the vehicle information is stored in the information storage 216, and distribution information and distribution timing are determined by the information distributor 217. The distribution information and distribution timing are determined in accordance with the functional unit of the request source and the update cycle, for instance.

When the vehicle information is stored in the information storage 216 and the distribution information and distribution timing are determined, the CPU 201 distributes the information by the information distributor 217 (step S9).

In the above embodiment, in the integration step (steps S4, S5), multiple information acquisition requests including a common item among respective information acquisition requests issued from at least two functional units are integrated into a single information acquisition request, and in the transmission step (step S6), the integrated information acquisition request is transmitted to the in-vehicle device 3. On the other hand, in the reception step (step S7), vehicle information to be used in the at least two functional units is provided from the in-vehicle device 3. Thus, it is possible to suppress traffic between the mobile communication terminal 2 and the in-vehicle device 3 even in a case where multiple functional units are added to the mobile communication terminal 2. Consequently, it is possible to acquire necessary vehicle information at an appropriate timing for each of the multiple functional units.

In the integration step (step S5) according to an embodiment, the update cycle of the single information acquisition request can be set to the shortest update cycle among those of the multiple information acquisition requests including the common item.

In the above embodiment, since the integration step (step S5) includes setting the update cycle of the single information acquisition request to the shortest update cycle among the multiple information acquisition requests including the common item, it is possible to, in the transmission step (step S6), transmit the information acquisition request including the item with the shortest update cycle.

With the vehicular information processing system according to the present embodiments, it is possible to suppress an excessive increase in traffic between the mobile communication terminal 2 and the in-vehicle device 3 even in a case where multiple functional units are added to the mobile communication terminal 2. As a result, it is possible to acquire necessary vehicle information at an appropriate timing, compared with a conventional one, even in a case where multiple functional units are added. Additionally, the information storage can respond to information acquisition requests from each of the at least two functional units at different timings. Additionally, since the information distributor distributes the vehicle information stored in the information storage to the request source of the information acquisition request verified by the request verifier among the at least two functional units, it is possible to distribute the vehicle information only to an appropriate functional unit. Additionally, since the update cycle of the single information acquisition request is set to the shortest update cycle among those of the multiple information acquisition requests including the common item, it is possible to respond to the information acquisition request including the item with the shortest update cycle. Additionally, since the information acquisition request from each of the at least two functional units and the item are checked against the white list, it is possible to permit only an information acquisition request from an appropriate functional unit regarding an appropriate item. Further, the data management unit can update the white list to the latest version. The same effect as the above can be exhibited by the vehicular information processing program and the mobile communication terminal according to the present embodiments.

Furthermore, in the technique disclosed in Patent Document 1, vehicle information needs to be transmitted to an external server and processed at the server for processing the vehicle information, and thus the vehicle information cannot be treated when communication with the server is not established. By contrast, in the vehicular information processing system according the present embodiments, vehicle information can be acquired at a necessary timing, and the acquired information can be used in each functional unit. Thus, it is possible to utilize the vehicle information even without a server (i.e., even when connection to a server is not established).

The present invention is not limited to the embodiments described above, but includes modifications to the embodiments described above, and embodiments composed of combinations of those embodiments.

REFERENCE SIGNS LIST

1 Vehicular information processing system
11 Cable
2 Mobile communication terminal
20 Main control unit
21 Data management unit
211 Control part
212 Request receiver
213 Request verifier
214 Request integrator
215 Information receiver
216 Information storage
217 Information distributor
218 Request transmitter
22 POI function unit
23 Data collecting function unit
24 Third party function unit
25 UBI function unit Vehicular information processing system
26 Display unit
27 Operation input unit
28 Communication unit
29 Main storage unit
3 Vehicle device
31 Sensor (Built-in sensor)
32 Input/output unit
33 Display unit
34 Operation input unit
41 Function X unit
42 Function Y unit
43 Function Z unit
44 Function V unit
411, 421, 431, 441 Control part
412, 422, 432, 442 Data request part
413, 423, 433, 443 Data receiving part
414, 424, 434, 444 Data distribution part
S100 Server of automobile manufacturer
S200 Server of third party
S300 Server of POI
P100 Platform of big data
P200 Platform of UBI platform

The invention claimed is:

1. A vehicular information processing system comprising:
a mobile communication terminal including a communication unit for obtaining application software which uses vehicle information, the mobile communication terminal being configured to be provided with a functional unit added by the application software; and
an in-vehicle device configured to provide the mobile communication terminal with vehicle information to be used in at least two functional units, in response to an information acquisition request from the mobile communication terminal via a communication channel established between the in-vehicle device and the mobile communication terminal,
wherein the mobile communication terminal includes:
an integrator for integrating information acquisition requests that include a common item among information acquisition requests issued from each of the at least two functional units;
a transmitter for transmitting the integrated information acquisition requests to the in-vehicle device; and
a receiver for receiving the vehicle information to be used in the at least two functional units from the in-vehicle device, and
wherein the integrator is configured to set an update cycle of the integrated information acquisition requests to an update cycle that is the shortest among update cycles of the information acquisition requests that include the common item.

2. The vehicular information processing system according to claim 1,
wherein the mobile communication terminal includes:
a storage for storing the vehicle information received from the in-vehicle device at least until the update cycle of the integrated information acquisition requests ends; and
an information distributor for distributing the vehicle information stored in the storage to a functional unit among the at least two functional units that has issued the information acquisition request that is to be integrated.

3. The vehicular information processing system according to claim 2,
wherein the mobile communication terminal includes:
a request verifier for verifying the information acquisition requests issued from each of the at least two functional units;
a white-list storage storing a white list including a list of a functional unit permitted to request acquisition of information among the at least two functional units and a list of an item permitted to be requested; and
a white-list checker for checking the at least two functional units and an item requested from the at least two functional units against the white list.

4. The vehicular information processing system according to claim 3, further comprising a white-list providing server for providing the white list,
wherein the request verifier is configured to update the white list stored in the white-list storage to a white list obtained from the white-list providing server by the communication unit.

5. A vehicular information processing program configured to cause a mobile communication terminal including at least two functional units, which use vehicle information received from an in-vehicle device mounted on a vehicle via a communication channel established between the mobile communication terminal and the in-vehicle device, to execute:
    an integration step of integrating information acquisition requests that include a common item among information acquisition requests issued from each of the at least two functional units;
    a transmission step of transmitting the integrated information acquisition requests to the in-vehicle device;
    a reception step of receiving the vehicle information transmitted from the in-vehicle device in response to the information acquisition requests transmitted in the transmission step; and
    a distribution step of distributing the vehicle information received in the reception step to a request source of the information acquisition requests among the at least two functional units,
    wherein the transmission step includes setting an update cycle of the integrated information acquisition requests to an update cycle that is the shortest among update cycles of the information acquisition requests that include the common item.

6. A mobile communication terminal including a communication unit for obtaining application software which uses vehicle information, the mobile communication terminal being configured to be provided with a functional unit added by the application software, the mobile communication terminal comprising:
    an establisher for establishing a communication channel between the mobile communication terminal and an in-vehicle device mounted on a vehicle, the in-vehicle device being configured to obtain vehicle information;
    an integrator for integrating a plurality of information acquisition requests that include a common item among information acquisition requests issued to the in-vehicle device from each of at least two functional units;
    a transmitter for transmitting the integrated information acquisition requests to the in-vehicle device; and
    a receiver for receiving the vehicle information to be used in the at least two functional units from the in-vehicle device,
    wherein the integrator is configured to set an update cycle of the integrated information acquisition requests to an update cycle that is the shortest among update cycles of the information acquisition requests that include the common item.

7. The mobile communication terminal according to claim 6, further comprising
    a storage for storing the vehicle information received from the in-vehicle device at least until the update cycle of the integrated information acquisition requests ends; and
    an information distributor for distributing the vehicle information stored in the storage to a functional unit among the at least two functional units that has issued the information acquisition request that is to be integrated.

8. The vehicular information processing system according to claim 1,
    wherein the mobile communication terminal includes:
    a request verifier for verifying the information acquisition requests issued from each of the at least two functional units;
    a white-list storage storing a white list including a list of a functional unit permitted to request acquisition of information among the at least two functional units and a list of an item permitted to be requested; and
    a white-list checker for checking the at least two functional units and an item requested from the at least two functional units against the white list.

* * * * *